US012384293B2

(12) United States Patent
Abrashov et al.

(10) Patent No.: US 12,384,293 B2
(45) Date of Patent: Aug. 12, 2025

(54) METHOD FOR DETERMINING THE POSTURE OF A DRIVER

(71) Applicant: Continental Automotive Technologies GmbH, Hannover (DE)

(72) Inventors: Sergey Abrashov, Toulouse (FR); Martin Petrov, Toulouse (FR); Zachary Lebon, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 353 days.

(21) Appl. No.: 18/019,122

(22) PCT Filed: Jul. 29, 2021

(86) PCT No.: PCT/EP2021/071328
§ 371 (c)(1),
(2) Date: Feb. 1, 2023

(87) PCT Pub. No.: WO2022/033891
PCT Pub. Date: Feb. 17, 2022

(65) Prior Publication Data
US 2023/0311759 A1    Oct. 5, 2023

(30) Foreign Application Priority Data

Aug. 14, 2020  (FR) ........................ 2008496

(51) Int. Cl.
*B60Q 9/00*   (2006.01)
*G06T 7/70*   (2017.01)

(52) U.S. Cl.
CPC ............ *B60Q 9/008* (2013.01); *G06T 7/70* (2017.01); *G06T 2207/10016* (2013.01);
(Continued)

(58) Field of Classification Search
None
See application file for complete search history.

(56) References Cited

U.S. PATENT DOCUMENTS 7,376,248 B2    5/2008  Ertl et al.
2008/0294315 A1*  11/2008  Breed ................ G01S 17/88
                                                         701/49
(Continued)

FOREIGN PATENT DOCUMENTS

CN    103057503 A    4/2013
CN    108345689 A    7/2018
(Continued)

OTHER PUBLICATIONS

Abouelnaga et al., "Real-time Distracted Driver Posture Classification", Nov. 29, 2018, 8 pages, 32nd Conference on Neural Information Processing Systems (NIPS 2018), Montreal, CA.
(Continued)

*Primary Examiner* — Delomia L Gilliard
(74) *Attorney, Agent, or Firm* — Buchanan Ingersoll & Rooney PC (57) ABSTRACT

A method for determining the posture of a driver of a vehicle. The vehicle includes a camera capable of generating a sequence of images of the position of the driver of the vehicle and an electronic control unit including a memory zone, in which a plurality of image processing masks is recorded, with each mask being associated with a predetermined posture of the driver in their seat. The method includes the camera generating a sequence of images of the position of the driver and sending the sequence of images to the electronic control unit, computing, by the electronic control unit, for each mask of the plurality of masks, the convolution product of the mask with at least one image of the sequence of images received from the camera in order to
(Continued)

obtain a correlation coefficient, and determining the posture of the driver from the mask with the highest correlation coefficient.

9 Claims, 5 Drawing Sheets

(52) U.S. Cl.
CPC .............. *G06T 2207/30196* (2013.01); *G06T 2207/30261* (2013.01); *G06T 2207/30268* (2013.01)

(56) References Cited

U.S. PATENT DOCUMENTS

| | | |
|---|---|---|
| 2011/0178680 A1 | 7/2011 | Kato et al. |
| 2015/0274106 A1 | 10/2015 | Lorenz et al. |
| 2019/0047588 A1 | 2/2019 | Yabuuchi et al. |
| 2019/0359169 A1* | 11/2019 | Schutera ........... B60R 21/01538 |
| 2020/0293800 A1 | 9/2020 | Yoshimura et al. |

FOREIGN PATENT DOCUMENTS

| | | |
|---|---|---|
| CN | 109685026 A | 4/2019 |
| DE | 102014214978 A1 | 2/2016 |
| DE | 102016225406 A1 | 6/2018 |
| EP | 3572290 A1 | 11/2019 |
| JP | 2019034574 A | 3/2019 |
| JP | 2019074964 A | 5/2019 |
| WO | 9848372 A1 | 10/1998 |
| WO | 0249882 A2 | 6/2002 |
| WO | 2004081850 A1 | 9/2004 |
| WO | 2019111696 A1 | 6/2019 |

OTHER PUBLICATIONS

Fujioka et al., "Development of a Posture-Sensing Technique Using a Wide Angle Monocular Camera (Occupant Extraction Technique)", 2016, pp. 29-36, Fujitsu Ten Tech. J. No. 42.

Xing et al., "Identification and Analysis of Driver Postures for In-Vehicle Driving Activities and Secondary Tasks Recognition", Mar. 2018, vol. 5(1), 14 pages, IEEE Transactions on Computational Social Systems.

International Search Report and Written Opinion for International Application No. PCT/EP2021/071328, mailed Nov. 26, 2021, 10 pages.

International Search Report and Written Opinion for International Application No. PCT/EP2021/071328, mailed Nov. 26, 2021, 13 pages (French).

French Search Report for French Application No. 2008496, dated Apr. 26, 2021 with translation, 10 pages.

* cited by examiner

METHOD FOR DETERMINING THE POSTURE OF A DRIVER

CROSS REFERENCE TO RELATED APPLICATIONS

This application is the U.S. National Phase Application of PCT International Application No. PCT/EP2021/071328, filed Jul. 29, 2021, which claims priority to French Patent Application No. 2008496, filed Aug. 14, 2020, the contents of such applications being incorporated by reference herein.

FIELD OF THE INVENTION

The present invention relates to the field of transport and more specifically to a method for warning a driver of a vehicle and a vehicle implementing such a method. The aim of the invention is to improve existing warning solutions for drivers of vehicles, in particular in the case whereby the driver of the vehicle adopts a dangerous driving posture. The invention particularly applies to driving a motor vehicle, a train or an aircraft.

BACKGROUND OF THE INVENTION

It is currently common practice to monitor the driver of a motor vehicle in order to notify them when their behavior can represent a danger for their safety and that of the other passengers of the vehicle. For example, monitoring the face of a driver of a motor vehicle is known in order to notify them if they exhibit signs of distraction or sleepiness. Monitoring the driver of a motor vehicle is also known in order to adapt the behavior of the airbag system of the vehicle to the posture of the driver.

Document CN 103057503 A, incorporated herein by reference, describes, for example, a smart airbag device protecting the drivers or passengers as a function of their sitting posture and their body conditions. The smart airbag device comprises a detection unit, a control unit, and an airbag unit. The control unit is connected to the detection unit and to the airbag unit, respectively. The detection unit detects the physique and the sitting posture of a driver or a passenger, as well as the severity of the collisions of an automobile. The control unit judges whether or not an airbag must inflate and determines the inflation mode as a function of this information. The passengers are protected according to the information that is provided in real time concerning the physique and the sitting posture of the passenger and according to the real time information concerning the severity of the accident.

However, such a system is particularly complex and expensive because it requires the use of sensors in the seat of the driver, collision sensors, a 3D camera and processing of all the corresponding data, which requires significant and therefore costly processing capabilities. Furthermore, such a system proposes deactivating the airbag system of the vehicle when it considers that the posture of the driver is dangerous, which can prove to be dangerous for the driver and the other passengers of the vehicle.

Therefore, a requirement exists for a simple, reliable and effective solution for at least partly overcoming these disadvantages.

SUMMARY OF THE INVENTION

To this end, an aspect of the present invention firstly relates to a method for determining the posture of a driver of a vehicle, in particular a motor vehicle, said vehicle comprising a camera capable of generating a sequence of images of the position of the driver of said vehicle and an electronic control unit comprising a memory zone, in which a plurality of image processing masks is recorded, with each mask being associated with a predetermined posture of the driver in their seat, including a correct posture of the driver in their seat and at least one incorrect posture of the driver in their seat, said method comprising the following steps of:
- the camera generating a sequence of images of the position of the driver and sending said sequence of images to the electronic control unit;
- computing, by the electronic control unit, for each mask of the plurality of masks, the convolution product of said mask with at least one image of the sequence of images received from the camera in order to obtain a correlation coefficient;
- determining the posture of the driver from the mask with the highest correlation coefficient.

The method according to an aspect of the invention allows simple, reliable and efficient detection, from a camera and without the use of other sensors, of the posture of the driver. An aspect of the invention particularly applies to a motor vehicle in which it is advantageous to detect the posture of the driver in their seat relative to the steering wheel of the vehicle in order to notify them of a dangerous posture. An aspect of the invention also applies to driving a train or piloting an aircraft.

Preferably, the incorrect posture of the driver corresponds to a posture in which the chest or the head of the driver are too far from or too close to the steering wheel, for example, when their chest or their head are respectively less than 15 cm from the steering wheel or more than 130 cm from the steering wheel.

According to one aspect of the invention, the method further comprises, when the detected posture corresponds to an incorrect posture of the driver, a step of generating a warning for the driver so as to notify them that their posture is incorrect so that they correct it and thus avoid changing the state of the entire safety airbag system of the vehicle.

According to a feature of the invention, the camera is a 2D camera so as to allow simple and rapid processing of the sequences of images generated by said camera.

Preferably, the camera is placed behind the central rear view mirror of the driver in order to be able to film both the chest and the head of the driver and thus improve the precision of the detection of their posture.

Preferably, the predetermined postures include a first incorrect posture in which the driver is too far from the steering wheel and a second incorrect posture in which the driver is too close to the steering wheel.

In one embodiment, the vehicle further comprises a second camera capable of generating a sequence of images of the external environment of the vehicle, in particular the environment in front of the vehicle, and of sending said sequence of images to the electronic control unit and the electronic control unit is capable of detecting, in the received sequence of images, a collision risk of the vehicle with an external element, with a warning for the driver being generated when the collision risk is found and the detected posture corresponds to an incorrect posture. The use of a second additional camera allows a potential collision risk to be detected and the driver to be notified as such.

According to one aspect of the invention, the method comprises a preliminary step of determining the image processing masks, said preliminary step comprising generating a sequence of images for each predetermined posture of the driver in their seat and determining a mask for each generated sequence of images in order to be able to apply this mask to the images generated by the camera when the vehicle is running and thus determine the posture of the driver.

According to one feature of the invention, determining a mask for each generated sequence of images comprises determining the zone of pixels corresponding to the body of the driver in said generated sequence of images.

Advantageously, determining a mask for each generated sequence of images comprises determining the weight of each pixel relative to the definition of each posture.

In one embodiment, when the vehicle comprises a safety airbag system (airbags), the method comprises, following the detection of the second incorrect posture of the driver, deactivating, by the electronic control unit, said safety airbag system, preferably only of the airbag located in the steering wheel, in order to prevent the triggering of the steering wheel airbag from injuring them in the event it is triggered, and then reactivating said airbag or system as soon as the posture of the driver is detected as being correct once again.

An aspect of the invention also relates to a computer program product, characterized in that it comprises a set of program code instructions which, when they are executed by one or more processor(s), configure the one or more processor(s) to implement the method as described above.

An aspect of the invention also relates to an electronic control unit for a vehicle, in particular a motor vehicle, said vehicle comprising a camera capable of generating a sequence of images of the position of the driver of said vehicle, said electronic control unit comprising a memory zone, in which a plurality of image processing masks is recorded, with each mask being associated with a predetermined posture of the driver in their seat, including a correct posture of the driver in their seat and at least one incorrect posture of the driver in their seat, the electronic control unit being capable of:
  receiving a sequence of images of the position of the driver from the camera;
  computing, for each mask of the plurality of masks, the convolution product of said mask by at least one image of the sequence of images received from the camera in order to obtain a correlation coefficient;
  determining the posture of the driver from the mask with the highest correlation coefficient;
  generating a warning for the driver for them to correct their posture when the detected posture corresponds to an incorrect posture of the driver.

In one embodiment, the electronic control unit is capable of detecting, in the sequence of images received from a second camera, a collision risk of the vehicle with an external element, a warning intended for the driver is generated when the collision risk is found and the detected posture corresponds to an incorrect posture.

In one embodiment, when the vehicle comprises a safety airbag system (airbags), the electronic control unit is capable of, following the detection of the second incorrect posture of the driver, deactivating said safety airbag system, preferably only the airbag located in the steering wheel, in order to prevent the triggering of the steering wheel airbag from injuring them in the event it is triggered, and then reactivating said airbag or said system as soon as the posture of the driver is detected as being correct once again.

An aspect of the invention also relates to a vehicle, in particular a motor vehicle, a rail vehicle or an aircraft, comprising a camera capable of generating a sequence of images of the position of the driver of said vehicle and an electronic control unit as described above.

In one embodiment, the vehicle comprises a second camera capable of generating a sequence of images of the external environment of the vehicle, in particular of the environment located in front of the vehicle, and of sending said sequence of images to the electronic control unit.

In one embodiment, the vehicle comprises a safety airbag system.

In one embodiment, the vehicle is an autonomous driving vehicle and the electronic control unit is programmed to detect that the vehicle is driving in autonomous driving mode in order to avoid generating a warning when the driver is detected in an incorrect posture.

In one embodiment, the vehicle is an autonomous driving vehicle and there are many correct postures of the driver when the autonomous driving mode is activated. For example, a correct posture can correspond to a sleeping posture of the driver, a rest posture, a reading posture, etc. Thus, the electronic control unit does not warn the driver in these positions, which are considered to be correct when autonomous driving is activated but warns the driver when autonomous driving is deactivated, with these positions then becoming incorrect and therefore dangerous.

BRIEF DESCRIPTION OF THE DRAWINGS

Further features and advantages of aspects of the invention will become more clearly apparent upon reading the following description. This description is purely illustrative and should be read with reference to the appended drawings, in which.

DETAILED DESCRIPTION OF THE PREFERRED EMBODIMENTS

Figure 1:
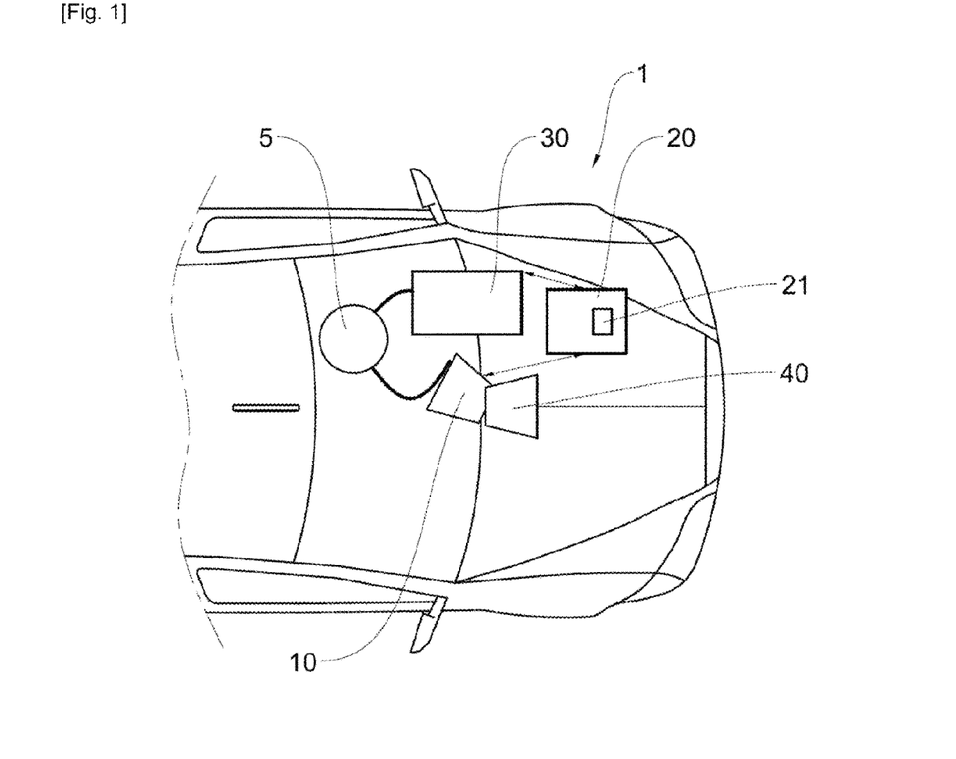
FIG. 1 illustrates one embodiment of the vehicle according to the invention.

FIG. 1 schematically shows an example of a vehicle 1 according to an aspect of the invention. In this example, the vehicle 1 is a motor vehicle, but in another example the vehicle could be a train or an aircraft.

The vehicle 1 comprises, in addition to a driver seat and a steering wheel (not shown for the sake of clarity), a first camera 10 and an electronic control unit 20.

The first camera 10 is capable of generating a sequence of images of the position of the driver 5 in the vehicle 1, in particular the chest and the head of the driver 5 of said vehicle 1 when said driver 5 is seated in the driver seat. Preferably, the first camera 10 is a 2D camera placed behind the central rear view mirror of the driver 5 mounted in front of the front windshield of the vehicle 1 (from the inside of the vehicle 1). The first camera 10 is capable of sending the sequences of images that it generates to the electronic control unit 20.

In this example, the vehicle 1 further comprises a safety airbag system 30 and a second camera 40 capable of generating a sequence of images of the environment located in front of the vehicle 1, in particular of the road when the vehicle 1 is travelling on a road.

This second camera 40 allows the environment located in front of the vehicle 1 to be filmed in order to be capable of detecting a collision, as will be described hereafter. The second camera 40 is capable of sending the sequences of images that it generates to the electronic control unit 20. The second camera 40 is optional and is not necessarily required for implementing an aspect of the invention, although it is advantageous.

The electronic control unit 20 is capable of receiving the sequences of images sent by the first camera 10 and by the second camera 40.

The electronic control unit 20 comprises a memory zone 21, in which a plurality of image processing masks M (referenced in FIG. 2) is recorded, with each mask M being associated with a predetermined posture of the driver 5 in their seat, including a correct posture of the driver 5 in their seat and at least one incorrect posture of the driver 5 in their seat. In this example, the memory zone 21 comprises a first mask M corresponding to a correct posture of the driver 5 in their seat, a second mask M corresponding to a posture of the driver 5 too far from the steering wheel of the vehicle, a third mask M corresponding to a posture of the driver 5 too close to the steering wheel of the vehicle and a fourth mask M corresponding to the absence of the driver 5 from their seat. The image processing masks M are defined and recorded beforehand, for example, in the factory or in the laboratory, in the memory zone 21 of the electronic control unit 20, i.e., before the vehicle 1 is used on a road.

The electronic control unit 20 is capable of receiving a sequence of images of the position of the driver 5 from the first camera 10, of computing, for each mask M of the plurality of masks M, the convolution product of said mask M by at least one image of the sequence of images received from the first camera 10 (i.e., to apply a convolution filter, per se known) in order to obtain a correlation coefficient, of determining the posture of the driver 5 from the mask M with the highest correlation coefficient, and of generating a warning for the driver 5 so that they correct their posture when the detected posture corresponds to an incorrect posture of the driver 5, i.e., when the driver 5 is too far from or too close to the steering wheel, for example, when their chest or their head are respectively less than 15 cm from the steering wheel or more than 130 cm from the steering wheel. Preferably, the warning remains active as long as the driver 5 does not return to the correct posture.

In this non-limiting example, the electronic control unit 20 is capable of detecting a collision risk of the vehicle 1 with an external element in the sequence of images received from the second camera 40, a warning intended for the driver 5 is generated when the collision risk is found and the detected posture corresponds to an incorrect posture. The external element can be, for example, another vehicle, a pedestrian or an element of the road infrastructure.

In this embodiment, in which the vehicle 1 comprises a safety airbag system 30 (airbags), the electronic control unit 20 is capable of deactivating said safety airbag system 30, preferably of deactivating only the steering wheel airbag, when the driver 5 is in the second incorrect posture, too close to the steering wheel, in order to prevent the triggering of said steering wheel airbag from injuring them in the event it is triggered and then of reactivating said airbag or system as soon as the posture of the driver 5 is detected by the electronic control unit 20 as being correct once again.

The electronic control unit 20 comprises a processor capable of implementing a set of instructions for carrying out these functions.

An aspect of the invention will now be described in an embodiment with reference to FIGS. 2 to 6.

Figure 2:
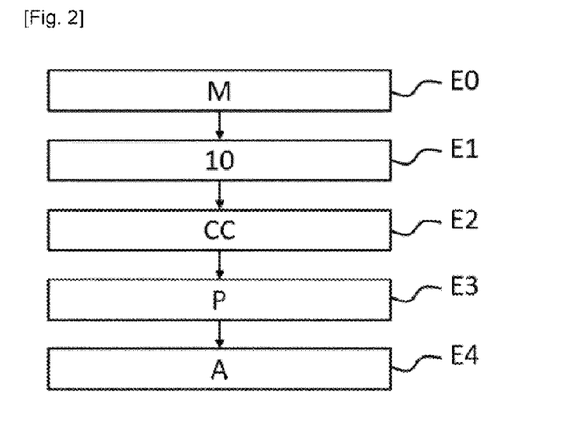
FIG. 2 illustrates one embodiment of the method according to the invention.

Firstly, the processing masks M are determined and then recorded in the memory zone of the electronic control unit in a preliminary initialization step E0, carried out in the factory or in the laboratory, for example. To this end, the exact driving configuration of the vehicle is reproduced, in particular by positioning a driver seat, a steering wheel and a camera identical to that which will be installed in the vehicle, while respecting the distances between these elements as they are defined in the vehicle.

Next, a standard driver, preferably a human or even a dummy, is positioned in the various postures in order to define the corresponding masks M from different sequences of images. In this preferred example, the standard driver is initially positioned in a "correct" posture in the seat, neither too far from nor too close to the steering wheel, with this posture being considered to be safe for driving, in particular in the event of a collision when a safety airbag system needs to be triggered. A sequence of images representing at least the chest and the head of the standard driver sitting in their seat in this correct posture, for example, 25 images, is then generated by the camera. The standard driver is then positioned in a first "incorrect" posture in the seat, too far from the steering wheel, with this posture being considered to be dangerous for driving, in particular in the event of a collision when a safety airbag system needs to be triggered. A sequence of images representing at least the chest and the head of the standard driver sitting in their seat in this first incorrect posture, for example, of 25 images, is then generated by the camera. The standard driver is then positioned in a second incorrect posture in the seat, too close to the steering wheel, with this posture being considered to be dangerous for driving, in particular in the event of a collision when a safety airbag system needs to be triggered. A sequence of images representing at least the chest and the head of the standard driver sitting in their seat in this second incorrect posture, for example, of 25 images, is then generated by the camera. Finally, in this example, a sequence of images representing the seat in the absence of a standard driver, for example, of 25 images, is also generated by the camera. Each of the four sequences of images will allow an image processing mask M to be defined.

In this example, each of the four sequences of images undergoes the following steps.

First, a histogram normalization operation is carried out on each of the four sequences of images. The histogram normalization operation allows the range of values of each image of the sequence to be extended by evenly spreading the gray scales of the image over the entire range of available values. In other words, this operation allows the intensities of the pixels to be better distributed over the entire range of possible values in order to adjust the contrast of each image of the sequence. The four sequences of normalized images are recorded on a memory medium.

Next, a median filter is applied to the images of each of the four sequences of images in order to filter the noise and the intensity outliers of the pixels. The median filter technique allows the noise to be reduced while preserving the contours of the image and involves replacing each entry with the median value of its vicinity.

The images of each of the four sequences of images are then segmented. This segmentation involves selecting the pixels with an intensity ranging between a minimum threshold and a maximum threshold and involves modifying their intensity so that it becomes equal to the maximum intensity, for example, 255. Such an operation allows the pixels that are neither too dark nor too bright to be distinguished from the pixels that are too dark and too bright by making them appear as the brightest pixels (in other words, bright).

Next, all the convex envelopes are detected on the images of each of the four sequences of images and the greatest are retained in order to form an image zone starting from the principle that they represent the contours of the body of the standard driver when they are visible on the image or even the contours of the seat in the absence of the standard driver on the seat.

Finally, the intensity of all the pixels located outside the zone formed in the preceding step is reduced to zero (the darkest intensity) in the images of the four sequences of normalized images that are recorded on the memory medium in order to obtain the four masks M in which the standard driver or the seat clearly appear and are identifiable in the corresponding four postures.

Figure 3:
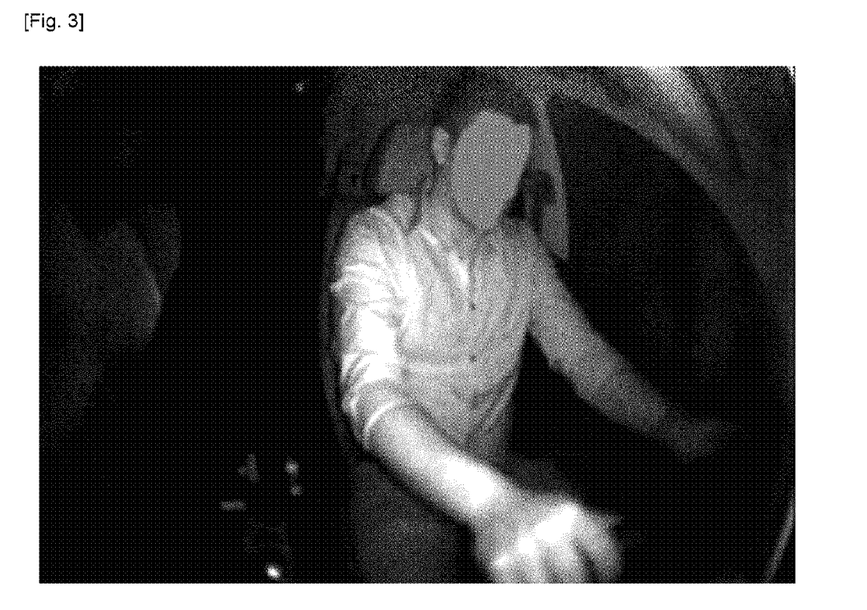
FIG. 3 illustrates an example of a mask corresponding to a correct posture.
Figure 4:
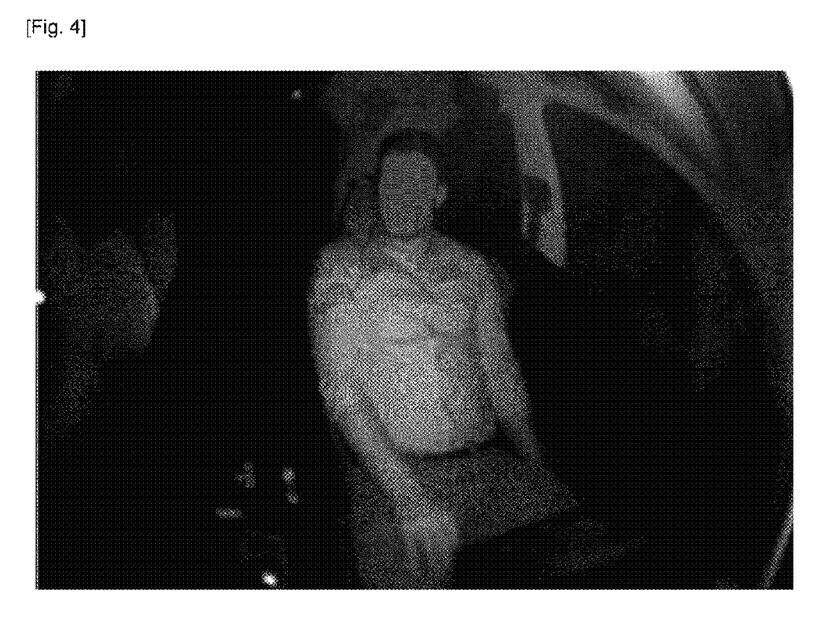
FIG. 4 illustrates an example of a mask corresponding to a first incorrect posture, too far from the steering wheel.
Figure 5:
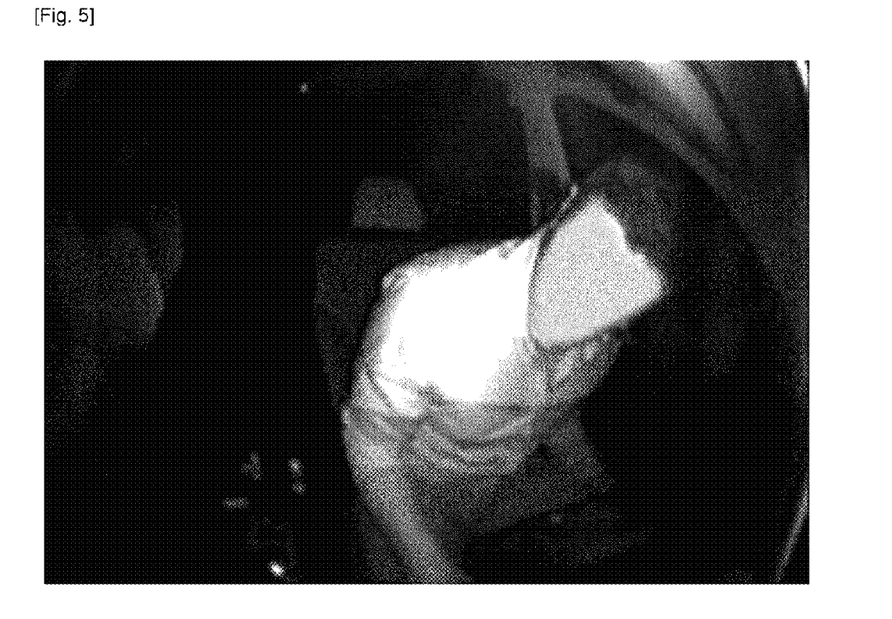
FIG. 5 illustrates an example of a mask corresponding to a second incorrect posture, too close to the steering wheel.
Figure 6:
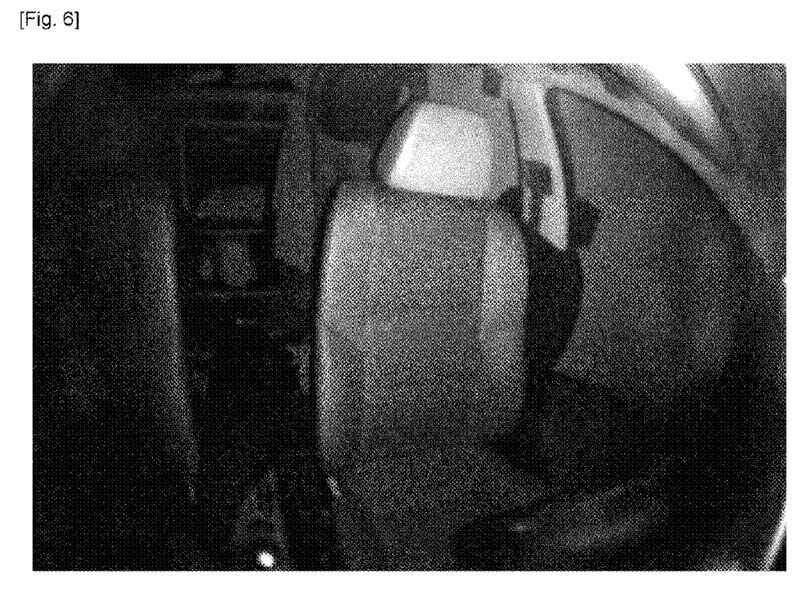
FIG. 6 illustrates an example of a mask corresponding to an absent posture of the driver.

FIG. 3 illustrates a photographic example of a mask corresponding to the correct posture. FIG. 4 illustrates a photographic example of a mask corresponding to the first incorrect posture (driver 5 too far from the steering wheel). FIG. 5 illustrates a photographic example of a mask corresponding to the second incorrect posture (driver 5 too close to the steering wheel). FIG. 6 illustrates a photographic example of a mask corresponding to the absent posture of the driver 5.

Once this preliminary step E0 is carried out, the four masks M are stored in the memory zone 21 of the electronic control unit 20 with a view to being used when the vehicle 1 is running.

Thus, in an operating phase, when the vehicle is running, the first camera 10 generates a sequence of images showing the location of the driver 5 in their seat and sends it to the electronic control unit 20 in a step E1.

The electronic control unit 20 receives the sequence of images of the position of the driver 5 from the first camera 10 and computes, for each of the four masks M recorded in its memory zone 21, the convolution product of said mask M by at least one image of the sequence of images received from the first camera 10 in order to obtain a correlation coefficient CC ranging between 0 and 1 in a step E2.

The electronic control unit 20 then determines, in a step E3, the posture P of the driver 5 as being that associated with the mask M with the highest correlation coefficient, i.e., of the mask M with the greatest probability of corresponding to the actual posture of the driver 5.

When the detected posture is that corresponding to the mask M for which the driver 5 is considered to be too far away (first incorrect posture, FIG. 4) or too close (second incorrect posture, FIG. 5), the electronic control unit 20 generates a warning A for the driver 5 in a step E4 for them to correct their posture. This warning A can be audible, visual or tactile (vibrations or the like), for example. Preferably, the warning A remains active as long as the driver 5 does not return to the correct posture (FIG. 3).

In the method according to an aspect of the invention, the use of the second camera 40 is optional. When it is used, the second camera 40 also generates a sequence of images when the vehicle 1 is running and sends it to the electronic control unit 20. This sequence of images represents the environment of the vehicle 1, preferably the front zone of the vehicle 1 (road and surroundings). Upon receipt of this sequence of images, the electronic control unit 20 detects an external element (other vehicle, pedestrian, element of the road infrastructure, etc.) in the sequence of images received from the second camera 40 and assesses the collision risk of the vehicle 1 with said external element. As such a collision risk detection is per se known, it will not be described in further detail herein. In this example, the collision risk with an external element can be low or high. Also, when a detected collision risk is high and the detected posture corresponds to a correct posture, the electronic control unit 20 does not trigger the warning A for the driver 5, since the danger of a collision is irrelevant. Similarly, in this example, the warning A is not triggered when a collision risk is considered to be low irrespective of the posture of the driver 5 (correct or incorrect). However, the warning A is triggered when the collision risk is high and the detected posture corresponds to an incorrect posture (FIG. 4 or 5).

The absent posture of the driver 5 in the seat (empty seat, FIG. 6) can be used to avoid false detections, i.e., to avoid detecting a correct posture while the driver 5 is in an incorrect posture, in particular too close to the steering wheel where the seat would be basically seen as being partly empty on the images. Indeed, in this case, the mask M, corresponding to the absent posture of the driver 5 (completely empty seat), allows a distinction to be made with certainty between an empty seat and a partly empty seat.

In the case of an autonomous vehicle 1, the electronic control unit 20 can be programmed to detect that the vehicle 1 is running in autonomous driving mode and in this case can avoid generating the warning when the driver 5 is detected as being in an incorrect posture (FIG. 4 or 5). Still in the case of an autonomous vehicle 1, the correct postures of the driver can be more varied such as, for example, a sleeping posture, a resting posture, a reading posture, etc.

When the vehicle 1 includes a safety airbag system (airbags), the electronic control unit 20 can deactivate said safety airbag system 30, preferably the steering wheel airbag, when the driver 5 is in the second incorrect posture (FIG. 5), too close to the steering wheel, in order to prevent the triggering of the steering wheel airbag from injuring them in the event it is triggered, and then reactivate it as soon as the posture of the driver 5 is correct once again.

An aspect of the invention therefore advantageously allows the driver 5 of a vehicle to be warned when their posture is incorrect and presents a danger to their safety when driving the vehicle, in particular in the event of a collision.

The invention claimed is:

1. A method for determining the posture of a driver of a vehicle, said vehicle comprising a camera capable of generating a sequence of images of a position of the driver of said vehicle and an electronic control unit comprising a memory zone, said method comprising:
   a preliminary step of determining a plurality of image processing masks, said preliminary step comprising generating a sequence of images for each predetermined posture of the driver in a driver's seat and determining a mask for each generated sequence of images, wherein each mask of the plurality of image processing masks is associated with a predetermined posture of the driver in a driver's seat, including a correct posture of the driver in the driver's seat and at least one incorrect posture of the driver in the driver's seat;
   recording each mask of the plurality of image processing masks in the memory zone;
   generating, by the camera, a sequence of images of the position of the driver and sending said sequence of images to the electronic control unit;

computing, by the electronic control unit, for each mask of the plurality of image processing masks recorded in the memory zone, a convolution product of said mask with at least one image of the sequence of images received from the camera in order to obtain a correlation coefficient; and determining the posture of the driver from the mask with the highest correlation coefficient.

2. The method as claimed in claim 1, further comprising, when the determined posture corresponds to an incorrect posture of the driver, generating a warning for the driver to correct their posture.

3. The method as claimed in claim 2, wherein the vehicle further comprises a second camera capable of generating a sequence of images of an external environment of the vehicle and of sending said sequence of images to the electronic control unit and the electronic control unit is configured to detect, in the received sequence of images, a collision risk of the vehicle with an external element, with a warning for the driver being generated when the collision risk is found and the detected posture corresponds to an incorrect posture.

4. The method as claimed in claim 1, wherein the camera is a 2D camera.

5. The method as claimed in claim 1, wherein the predetermined postures include a first incorrect posture in which the driver is too far from a steering wheel and a second incorrect posture in which the driver is too close to the steering wheel.

6. A non-transitory computer program product, comprising a set of program code instructions which, when they are executed by one or more processor(s), configure the one or more processor(s) to implement a method as claimed in claim 1.

7. The method as claimed in claim 1, wherein determining a mask for each generated sequence of images comprises determining the pixels corresponding to the body of the driver in said generated sequence of images.

8. An electronic control unit for a vehicle, said vehicle comprising a camera capable of generating a sequence of images of a position of the driver of said vehicle, said electronic control unit comprising a memory zone, the electronic control unit being configured to:

determine a plurality of image processing masks by generating a sequence of images for each predetermined posture of the driver in a driver's seat and determining a mask for each generated sequence of images, wherein each mask of the plurality of image processing masks is associated with a predetermined posture of the driver in a driver's seat, including a correct posture of the driver in the driver's seat and at least one incorrect posture of the driver in the driver's seat;

record each mask of the plurality of image processing masks in the memory zone;

receive a sequence of images of the position of the driver from the camera;

compute, for each mask of the plurality of image processing masks recorded in the memory zone, a convolution product of said mask by at least one image of the sequence of images received from the camera in order to obtain a correlation coefficient; and determine the posture of the driver from the mask with the highest correlation coefficient.

9. A vehicle comprising a camera capable of generating a sequence of images of the position of the driver of said vehicle and an electronic control unit as claimed in claim 8.

* * * * *